United States Patent [19]
Phillips et al.

[11] Patent Number: 5,214,335
[45] Date of Patent: May 25, 1993

[54] BRUSH AND SLIP RING APPARATUS FOR DYNAMOELECTRIC MACHINES

[75] Inventors: Gregory A. Phillips, Luxembourg, Luxembourg; Raymond Prater; Thomas C. Ruth, both of Anderson, Ind.

[73] Assignee: General Motors Corporation, Detroit, Mich.

[21] Appl. No.: 909,860

[22] Filed: Jul. 7, 1992

[51] Int. Cl.⁵ .......................................... H02K 13/00
[52] U.S. Cl. .................................. 310/232; 310/68 E; 310/72; 310/147; 310/148; 310/149; 310/248; 310/263
[58] Field of Search ............... 310/232, 231, 238, 229, 310/230, 239, 241, 242, 245, 248, 249, 148, 251–253, 263, 244, 240, 143, 147, 261, 68 E, 180, 198, 71, 149

[56] References Cited

U.S. PATENT DOCUMENTS

| | | | |
|---|---|---|---|
| 1,166,923 | 1/1916 | Neeley | 310/248 |
| 2,450,698 | 10/1948 | Thomas | 171/228 |
| 2,739,278 | 3/1956 | Blankenship | 310/231 |
| 2,861,238 | 11/1958 | Blankenship | 310/231 |
| 2,978,600 | 4/1961 | Silverman | 310/232 |
| 3,544,868 | 12/1970 | Bates | 310/238 |
| 3,596,225 | 7/1971 | Cary | 310/247 |
| 3,601,645 | 8/1971 | Whiteheart | 310/249 |
| 3,826,942 | 7/1974 | Twarog, Jr. | 310/232 |
| 3,870,914 | 3/1975 | Walker | 310/232 |
| 4,086,509 | 4/1978 | Manson | 310/232 |
| 4,174,142 | 11/1979 | Pesce | 310/242 |
| 4,208,601 | 6/1980 | Tardieu | 310/231 |
| 4,337,407 | 6/1982 | Hummert | 310/249 |
| 4,346,321 | 8/1982 | Frister | 310/232 |
| 4,422,918 | 12/1983 | Inoue | 204/206 |
| 4,617,485 | 10/1986 | Nakamura | 310/263 |
| 4,645,962 | 2/1987 | Freeman | 310/232 |
| 4,959,577 | 9/1990 | Radomski | 310/263 |

FOREIGN PATENT DOCUMENTS 2425578 2/1975 Fed. Rep. of Germany .
3139217 4/1983 Fed. Rep. of Germany .
1-260775 10/1989 Japan .

Primary Examiner—R. Skudy
Attorney, Agent, or Firm—Creighton R. Meland

[57] ABSTRACT

A brush and slip ring apparatus for an alternating current generator. A brush assembly is secured to a rotor shaft of the generator to rotate therewith. The brush assembly includes two axially spaced brushes that are pivoted to a brush support that is secured to the shaft. When the shaft is rotated, the brushes move outwardly away from the shaft due to centrifugal force. The brushes respectively engage two axially spaced fixed slip rings that surround the brush assembly. The brushes are maintained engaged with the slip rings due to centrifugal forces developed by the pivotally mounted brushes. The brushes are connected to a field coil of the rotor of the generator.

9 Claims, 2 Drawing Sheets

BRUSH AND SLIP RING APPARATUS FOR DYNAMOELECTRIC MACHINES

This invention relates to a brush and slip ring apparatus for dynamoelectric machines, and more particularly to such apparatus for feeding current to the field coil of a rotor of an alternating current generator.

Brush and slip ring apparatus for feeding current to the field coil of the rotor of an alternating current generator are known that use a pair of brushes that are spring biased into contact with slip rings that are carried by a rotor shaft of the alternating current generator. In this known arrangement, the brushes are supported by a brush holder and the brushes are urged radially inwardly into engagement with the slip rings by the springs. The slip rings in this arrangement surround the rotor shaft and accordingly the circular outer faces of the slip rings face radially outwardly.

One of the objects of this invention is to provide a brush and slip ring apparatus that does not require springs for forcing the brushes into contact with the slip rings. In accordance with this aspect of the invention, the brushes are pivoted to a brush support that is secured to the rotor shaft and as the rotor shaft rotates, the brushes move by centrifugal force into engagement with the slip rings. More specifically, the brushes are pivotally connected to pivot pins that are secured to a brush support. The brush support is fixed to the rotor shaft and rotates with rotation of the rotor shaft. The slip rings are fixed and surround the pivotally mounted brushes. The pivotally mounted brushes move radially outwardly by centrifugal force and this force holds the brushes against the slip rings as the rotor shaft rotates.

Figure 1:
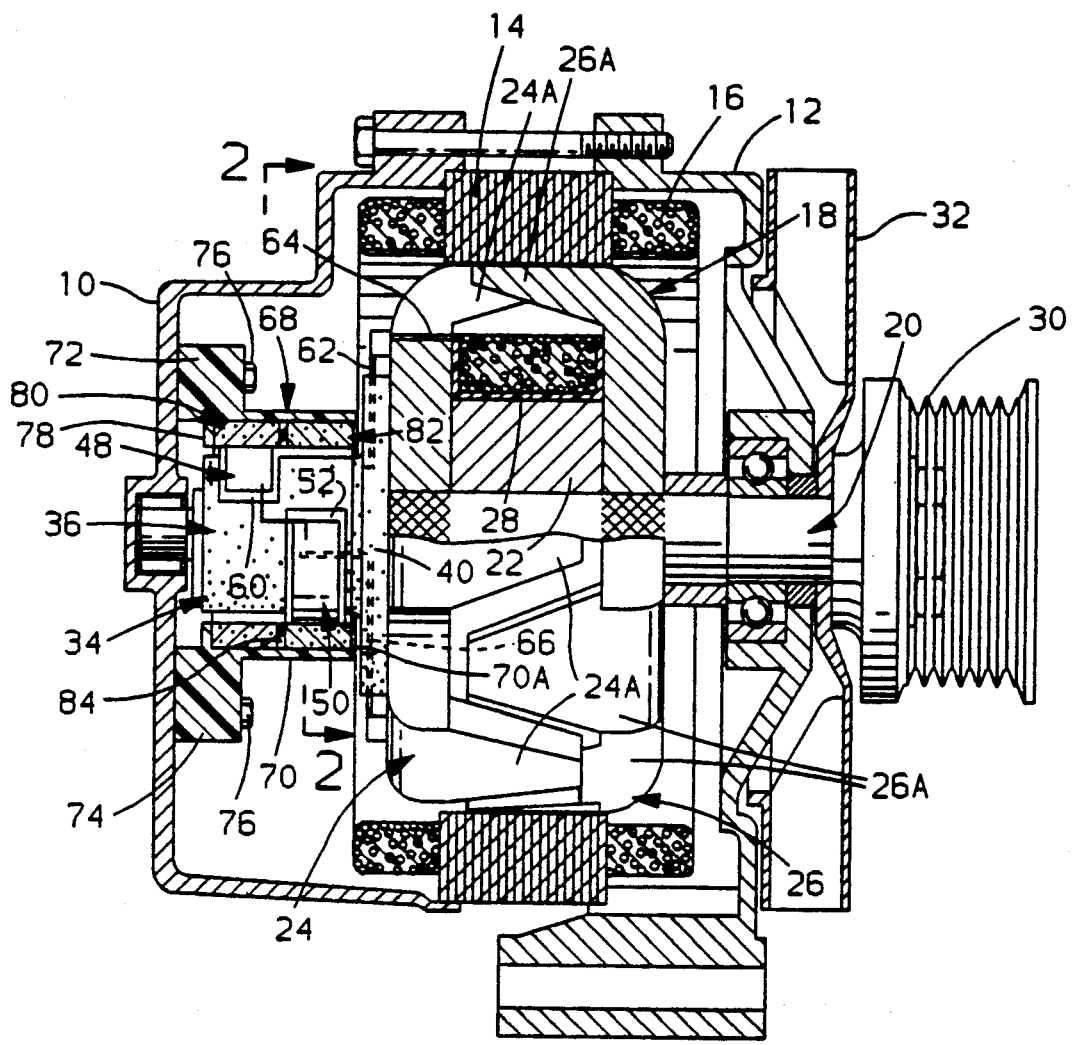
FIG. 1 is a sectional view of an alternating current generator that has a brush and slip ring apparatus made in accordance with this invention.

Referring now to the drawings, an alternating current generator is shown in FIG. 1 that has end frames 10 and 12. The end frames support a stator assembly comprised of a stator core 14 and a stator winding 16. The end frames 10 and 12 support a rotor generally designated as 18. Rotor 18 is comprised of a rotor shaft 20 that carries an annular rotor core 22 and two pole members or segments 24 and 26. Pole member 26 has a plurality of teeth or fingers 26A that interfit or are interleaved with pole teeth or fingers 24A of pole member 24 in a known manner.

The rotor 18 has a field coil 28 that is disposed about core 22. Rotor shaft 20 is connected to pulley 30. A cooling fan 32 is provided that is driven by shaft 20.

The left end of the rotor shaft 20 as viewed in FIG. 1, carries a brush assembly which is generally designated as 34. The assembly 34 is comprised of a part that is formed of a plastic electrical insulating material. This part has a hub or tubular and radially extending conductor supporting or flange portion 40 that abuts pole member 24.

The tubular portion 36 of assembly 34 has an internal bore defined by eight internal flat surfaces 42. The flat surfaces 42 on portion 36 engage eight complementary flat surfaces 44 on an integral axially extending portion 46 of rotor shaft 20. The portion 36 is press fitted to the integral axially extending portion 46 of rotor shaft 20. Therefore, the brush assembly 34 is connected to rotor shaft 20 and is rotatably driven by rotor shaft 20.

The brush assembly 34 has two pivotally mounted brushes designated respectively as 48 and 50. Each brush is formed of an electrically conductive metallic material such as copper.

Figure 2:
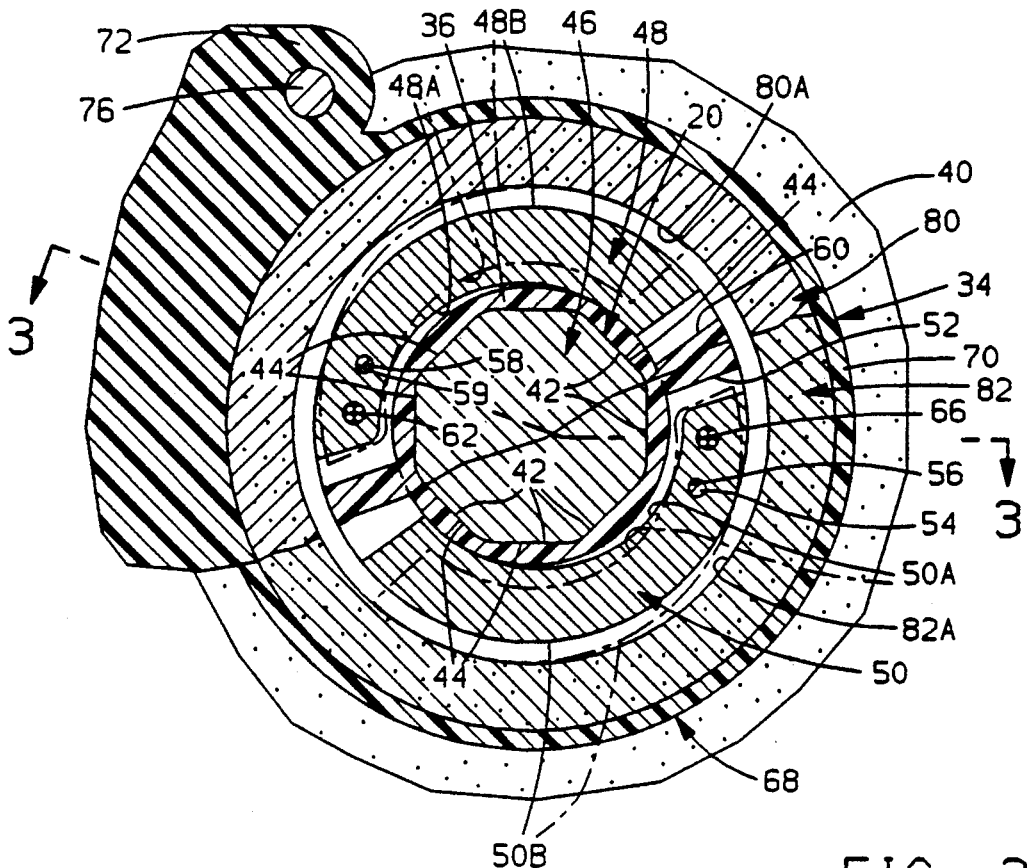
FIG. 2 is an enlarged multi-plane sectional view taken along line 2—2 of FIG. 1.

The brush 50 is located in a slot 52 formed in portion 36 of brush assembly 34. The brush 50, as shown in FIG. 2, has an arcuate configuration and is defined by an arcuate inner surface 50A and an arcuate outer surface 50B. A pivot pin 54 extends through an opening 56 formed in brush 50 Pivot pin 54 is also located in openings or hole (not shown) formed in portion 36 that are located at opposite sides of slot 52. The fixed pivot pin 54 pivotally supports the brush 50 for pivotal movement about pin 54. It can be seen that brush 50 is pivoted to pin 54 at a point that is near one end of brush 50. Accordingly, brush 50 operates like a flyweight, that is, brush 50 moves outwardly by centrifugal force when the rotor shaft rotates.

Figure 3:
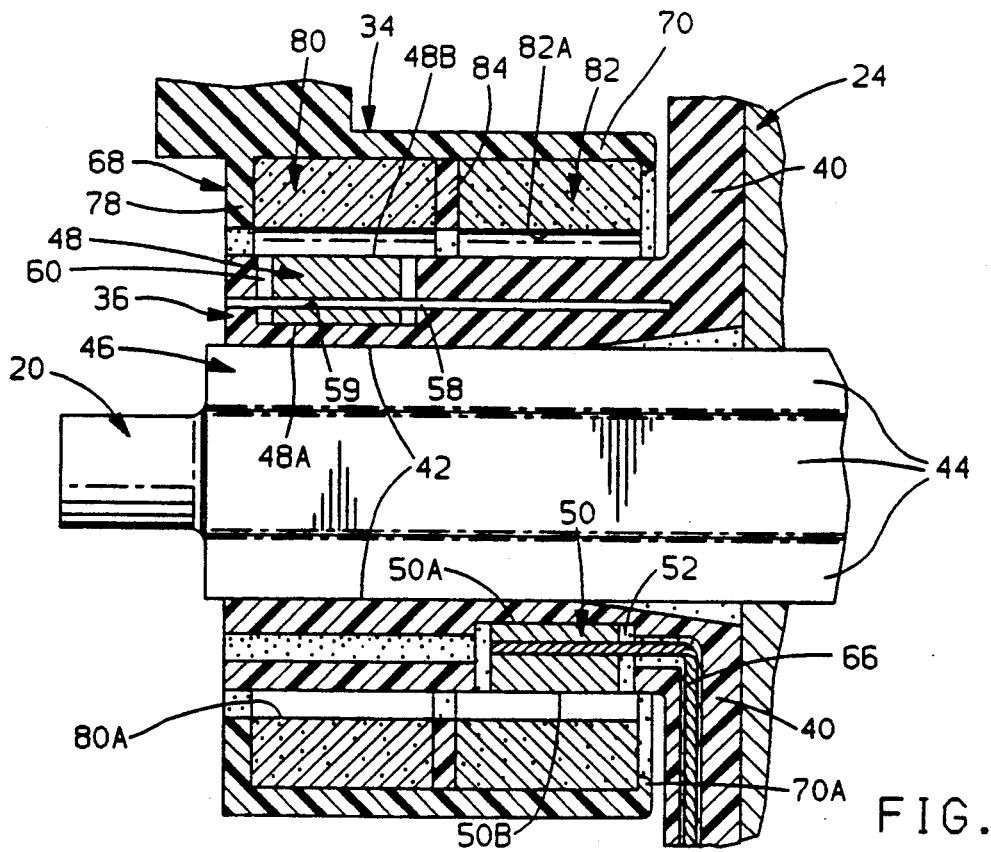
FIG. 3 is a sectional view taken along line 3—3 of FIG. 2.

The other brush 48 has the same arcuate shape as brush 50. Brush 48 is pivotally supported by a pivot pin 58 which passes through an opening 59 in brush 48 and which is supported by hub portion 36 in the same manner that pin 54 is supported, as shown in FIG. 3. Brush 48 is located in a slot 60 formed in hub portion 36. The brush 48 has an inner arcuate surface 48A and an outer arcuate surface 48B.

The hub portion 36 which is secured to rotor shaft 20 forms a brush support for brushes 48 and 50 and these brushes are pivotally supported by the brush support.

The brush 48 is electrically connected to a flexible electrical conductor 62 which is supported in part by flange portion 40 and which is electrically connected to one side of field coil 28 by conductor 64. Brush 50 is connected to a flexible conductor 66 which is like conductor 62. Conductor 66 is electrically connected to an opposite side of field coil 28.

The brush and slip ring apparatus of this invention has a fixed slip ring assembly generally designated as 68 that is secured to end frame 10. This assembly is comprised of a one-piece part that is formed of plastic electrical insulating material. This part has a tubular portion 70 and a pair of integral mounting bracket portions 72 and 74. The bracket portions 72 and 74 are secured to end frame 10 by screw fasteners 76 that pass through the respective bracket portions and are threaded into threaded openings formed in end frame 10. One end of the tubular portion 70 has an integral annular flange 78.

The slip ring assembly has two cylindrical slip rings 80 and 82 which are molded rings of carbon material. The outer surface of the slip rings engage an inner surface of tubular portion 70. A cylindrical insulator 84 formed of electrical insulating material is disposed between slip rings 80 and 82. The slip rings 80 and 82 and insulator 84 are tightly clamped between a spun-over portion 70A of tubular portion 70 and the flange 78 to thereby fix slip rings 80 and 82 and insulator 84 from movement relative to tubular portion 70.

Slip ring 80 has an inner cylindrical brush contacting surface 80A that is aligned with brush 48 and which is engaged by a portion of surface 48B of brush 48. Slip ring 82 has an inner cylindrical brush contacting surface 82A that is aligned with brush 50 and which is engaged by a portion of the surface 50B of brush 50.

The slip rings 80 and 82 are provided with integral radially extending electrical connector portions (not illustrated) that extend through openings formed in tubular portion 70. These connector portions, in use, are connected respectively to a voltage regulator and to ground in a manner well known to those skilled in the art. The voltage regulator can be carried by a supporting portion that is integral with tubular portion 70 and supporting bracket portions 72 and 74.

The operation of the brush and slip ring apparatus of this on will now be described. When the rotor shaft 20 is not rotating, or in other words is not being driven, the brushes 48 and 50 are in the full-line position shown in FIG. 2. When rotor shaft 20 is rotating, or in other words is being driven, the brushes 48 and 50 tend to move radially outwardly due to centrifugal force and they eventually move to a position where portions of surfaces 48B and 50B adjacent the tips of brushes 48 and 50 respectively engage fixed slip rings 80 and 82. This position of brushes 48 and 50 shown is shown in dotted lines. By way of example, and not by way of limitation, the rotor speed at which the brushes engage the slip rings may be about 1200 RPM. It can be appreciated that the brushes 48 and 50 operate like flyweights that are pivoted respectively to pivot pins 58 and 54. The amount that brushes 48 and 50 pivot may be about five degrees. It can be appreciated that the centrifugal force that forces the brushes into contact with the slip rings increases as rotor shaft speed increases.

Some of the advantages of the brush and slip ring apparatus of this invention are listed as follows: 1. The apparatus eliminates the need for springs for forcing brushes into contact with slip rings. 2. The force applied to a brush varies with variation in rotor speed and thus at high speeds where brush bounce is usually a problem, the apparatus of this invention increases brush force with increasing rotor speed to maintain contact between the brushes and the slip rings. 3. The surface area of carbon (carbon slip rings 80 and 82) is increased as compared to conventional brush-slip ring apparatus where the brush end of the brushes are spring-biased into engagement with rotatable slip rings. 4. The brushes will wear a path into the slip rings thus helping to maintain a smooth surface to ensure good brush contact. 5. The apparatus of this invention lends itself to a sealed brush-slip ring design.

The embodiments of the invention in which an exclusive property or privilege is claimed are defined as follows:

1. A brush and slip ring apparatus for a dynamoelectric machine comprising, a rotor for said dynamoelectric machine, said rotor comprising a rotatable shaft and a field coil, a brush support carried by and connected to said rotatable shaft whereby said brush support rotates with rotation of said rotatable shaft, at least one brush supported by said brush support, means electrically connecting said brush to said field coil, said brush being supported by said brush support by means which permits said brush to move radially outwardly relative to said brush support by centrifugal force when said shaft is rotated at a predetermined speed, an annular slip ring disposed about said brush support and aligned with said brush, said brush slidably engaging said slip ring and being maintained engaged with said slip ring solely by centrifugal force and means for supporting said slip ring in a fixed position.

2. The brush and slip ring apparatus according to claim 1 where said brush is pivotally supported by said brush support.

3. The brush and slip ring apparatus according to claim 1 wherein said brush support carries a pivot pin and where said brush is pivotally connected to said pivot pin.

4. The brush and slip ring apparatus according to claim 1 where said brush is formed of copper and said slip ring is formed of carbon.

5. The brush and slip ring apparatus according to claim 1 where said dynamoelectric machine is an alternating current generator.

6. A brush and slip ring apparatus for a dynamoelectric machine comprising, a rotatable shaft, a brush support secured to said rotatable shaft whereby said brush support rotates with rotation of said rotatable shaft, a first brush, a second brush, said first brush axially spaced from said second brush, means for pivotally connecting said first brush to said brush support such that said first brush pivots outwardly relative to said brush support by centrifugal force when said shaft and brush support are rotated at a predetermined speed, means for pivotally connecting said second brush to said brush support such that said second brush pivots outwardly relative to said brush support by said centrifugal force when said shaft and brush support are rotated at a predetermined speed, first and second axially spaced slip rings disposed about said first and second brushes, said first axially spaced slip ring being aligned with said first brush, said second axially spaced slip ring being aligned with said second brush, said first brush slidably engaging said first axially spaced slip ring and being maintained engaged with said first axially spaced slip ring by said centrifugal force, said second brush slidably engaging said second axially spaced slip ring and being maintained engaged with said second axially spaced slip ring by axially spaced centrifugal force, and means for supporting said first axially spaced said slip ring and said second axially spaced slip ring in a fixed position.

7. The brush and slip ring apparatus according to claim 6 where said brush support carries first and second pivot pines, said first brush being pivotally connected to said first pivot pin and said second brush being pivotally connected to said second pivot pin.

8. The brush and slip ring apparatus according to claim 6 where said first and second brushes are both formed of copper and where said first and second slip rings are both formed of carbon.

9. The brush and slip ring apparatus according to claim 6 where said dynamoelectric machine is an alternating current generator that has a rotor, said rotor having a field coil, said first and second brushes electrically connected to said field coil of said rotor of said alternating current generator.

* * * * *